April 3, 1962

A. E. KETLER, JR 3,027,971

ENGINE LUBRICATION SYSTEM

Filed April 13, 1960

Inventor

ALBERT E. KETLER, JR.

By R. J. Tompkins

Attorney

April 3, 1962   A. E. KETLER, JR   3,027,971
ENGINE LUBRICATION SYSTEM
Filed April 13, 1960   2 Sheets-Sheet 2

Inventor
ALBERT E. KETLER, JR.
By R. J. Tompkins
Attorney

United States Patent Office 3,027,971
Patented Apr. 3, 1962

3,027,971
ENGINE LUBRICATION SYSTEM
Albert E. Ketler, Jr., Cincinnati, Ohio, assignor, by mesne assignments, to the United States of America as represented by the Secretary of the Navy
Filed Apr. 13, 1960, Ser. No. 22,068
3 Claims. (Cl. 184—6)

The present invention relates to a pressurized lubrication system for jet engines and more particularly to a pressurized lubrication system for jet engines which employs a particular type of differential pressure regulator having a plurality of outlets which maintains the pressure in the lube oil sump at a predetermined percentage of the pressure immediately surrounding the sump.

The pressurization of aircraft lube oil sumps is desirable and in many instances necessary to assure proper scavenging of lube oil during high altitude maneuvers. In cases when the scavenge pump is placed external of the actual sump, the oil flow from the sump to the pump is dependent upon absolute sump pressure. The scavenge pump (regardless of its size) will never scavenge a sufficient quantity of oil unless the absolute pressure inside the sump is greater than the vapor pressure of oil by an amount equal to the pressure drop in the line connecting the sump to the scavenge pump. Failure, due to inadequate "back pressure," results in flooding the sump with oil. The scavenge pump at this time is pumping oil vapor, which occupies a tremendous volume at high altitudes (approximately 50,000 feet), instead of the equivalent volume of hot lube oil. The sump area must therefore be pressurized above atmosphere to assure that the proper amount of oil flows from the sump to the scavenge pump. The amount of pressure is limited on the low side by the scavenge line pressure drop considerations discussed above and on the high side by the absolute pressure on the opposite side of the seals. The pressure outside the seal must always remain greater than that inside the sump to assure that all leakage is inward to the sump. Any leakage of the oil to the outside could cause fires or other damage to the hot turbine components outside these seals. Sump pressurization is obtained most easily by bleeding compressor air directly into the vent lines interconnecting all sump areas together with a reservoir located somewhere on the airframe.

It is therefore desirable to regulate this air flow so that the pressure differential across the seals is maintained at the right ratio despite variations in engine speed, altitude and performance.

Prior to this time, the problem of pressurizing an area to a ratio of some other pressure by using a single valve has never been known to the knowledge of applicant. The present invention eliminates the need of a second valve to control the second pressure.

The present invention employs a single valve to maintain the pressure of one outlet at a predetermined ratio of the other outlet. It accomplishes this by employing a diaphragm which has both sides subjected to pressure. The pressure ratio is controlled by a diaphragm which has unequal areas exposed to pressure thereby producing the desired pressures in response to the respective pressure exposed areas.

An object of the present invention is the provision of an arrangement for maintaining a pressure on the lubrication system whenever the delivery pressure of the scavenge pumps drops as a result of failure of the lubricant to reach the pumps.

Another object of the present invention is the provision of a valve which is simple to manufacture and does not require close machining tolerances.

A further object of the present invention is to provide a valve which will never become out of adjustment because it utilizes a sliding valve instead of the usual sensitive, spring loaded type needle valve.

Still another object of the present invention is the provision of a valve which will maintain one outlet pressure at a predetermined percentage of the other outlet pressure.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
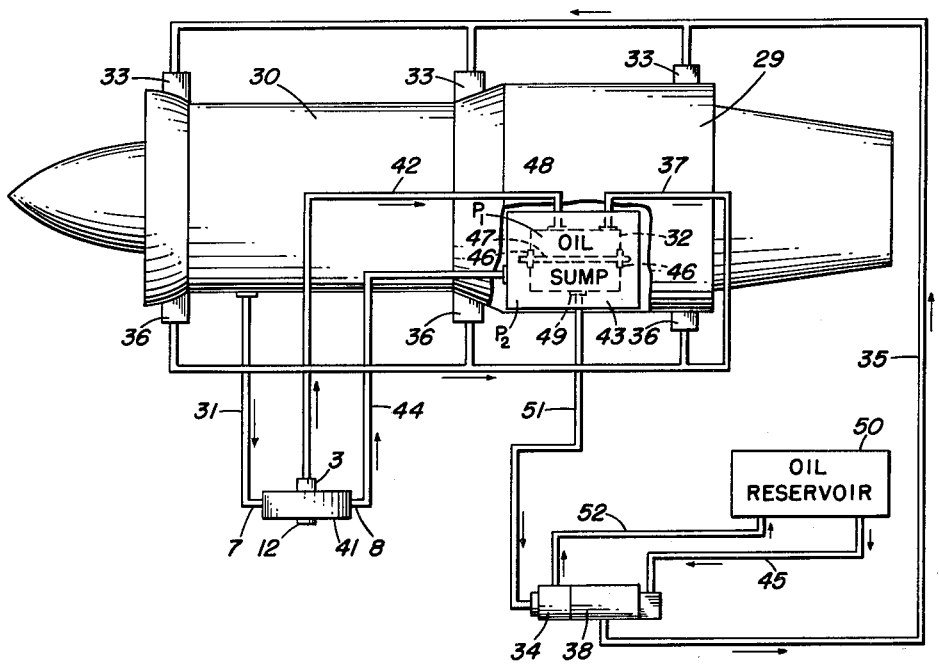
FIG. 1 shows a schematic view of an engine lubrication system wherein this particular valve is employed.

Referring now to the drawings, wherein like reference characters designate like or corresponding parts throughout the several views, there is shown in FIG. 1, which illustrates a preferred embodiment of the lubrication system, a jet engine 29 with its compressor 30, line 31 being a compressor bleed line which bleeds air from the compressor for the pressurization of the oil sump 32. The engine 29 is provided with lubrication points which are supplied with oil from the lubrication pump 38 through line 35. The lubrication pump 38 is connected to the oil reservoir 50 via oil line 45.

After the oil is fed to the various lubrication points 33, it is picked up at its drain points 36 and it is sent to the oil sump 32 via the drain line 37 and then transferred to the oil reservoir 50 via the oil lines 51 and 52 by means of scavenge pump 34.

When the air is bled from the compressor via bleed line 31 it is supplied to the pressure regulator 41. The pressure regulator 41 is provided with two outlets 3 and 8. The outlet 3 is connected to pressure line 42 leading to the oil sump 32 and the outlet 8 is connected to the oil sump container 43 via line 44.

The purpose of the pressure regulator 41 is to maintain the pressure $P_1$ within the oil sump at a predetermined percentage of the pressure $P_2$ which is outside of the oil sump 32. The oil sump 32 is provided with seals 46 that seal the shaft 47. The oil sump 32 is provided with an oil drain line 37 which supplies oil to the sump 32 which is received by the drains 36. The oil sump 32 is further provided with an air pressure inlet 48 and an outlet 49 that connects to line 45 supplying oil to the scavenge pump 34. The scavenge pump 38 takes suction from the oil sump 32 and supplies the oil to the oil reservoir 50 via lines 51 and 52. The pressure pump 38 takes suction from the oil reservoir 50 via line 45 and supplies the oil under pressure to the lubrication points 33 via line 35.

Figure 2:
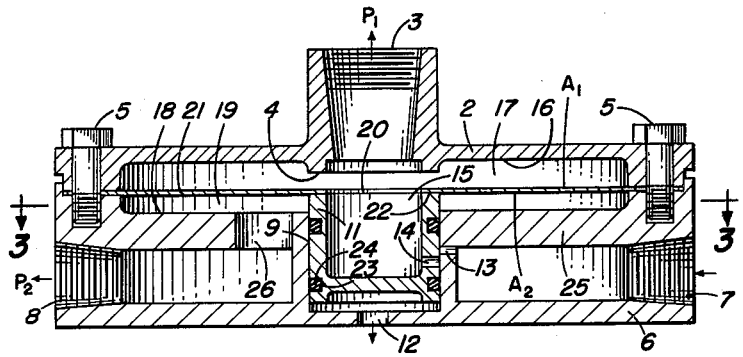
FIG. 2 shows a vertical section of the pressure regulator.
Figure 3:
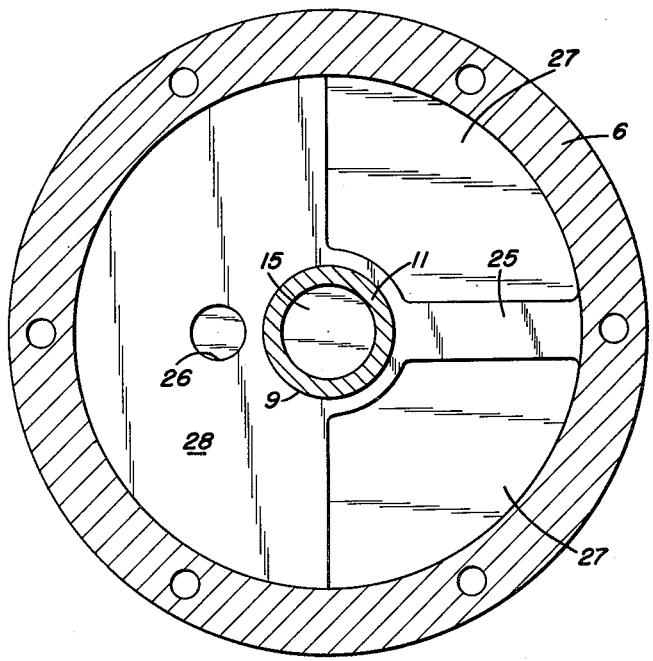
FIG. 3 shows a section of the pressure regulator taken on the line 3—3 of FIG. 2, looking in the direction of the arrows.

The pressure regulator 41, shown in FIGS. 2 and 3 includes an upper body portion 2 having a fluid pressure outlet 3 and an annular valve stop 4, said upper body portion 2 being fixedly secured, as shown by bolts 5, to the lower body portion 6. The lower body portion 6 has a fluid pressure inlet 7 which supplies the fluid under pressure which is to be controlled. The lower body portion 6 is also provided with a pressure outlet 8. The lower body portion 6 is also provided with a centrally located bore or recess 9 which is adapted to receive a sliding valve 11 and also an aperture or vent opening 12 which leads to the atmosphere and thereby prevents a pressure buildup underneath the valve 11. The lower body portion 6 is also provided with an orifice 13 which serves as the fluid admitting passage which permits the fluid to pass through sliding valve aperture 14 and then through the hollow portion 15 of the sliding valve 11 allowing access to the upper chamber 18 and pressure outlet 3.

It is to be noted that underside 16 of the upper body portion 2 is recessed to provide an upper chamber 17. The upper side 18 of the lower body portion 6 is recessed to provide a lower chamber 19. These chambers are formed by the diaphragm 21 which serves as a dividing wall between said chambers. The diaphragm is provided with an opening 20 which is the same diameter as the hollow portion 15 of sliding valve 11. The area $A_1$ is that area which is formed by the upper face of the diaphragm 21, area $A_2$ is that area which is formed by the lower face of the diaphragm 21, area $A_2$ is less than area $A_1$ by the amount taken up by the valve 11. The diaphragm 21 is fixedly secured to the upper peripheral portion 22 of the sliding valve 11 as by welding or by other suitable means of attachment. The sliding valve 11 is shown with a pair of annular recesses 23 to accommodate O-rings 24. It is to be understood that the diameter of the sliding valve 11 can be varied so as to produce different pressure ratios. To cover a wider range of pressure control, bore 23 can be made considerably larger and different sized sliding valves and diaphragms may be used. For example, if it is desired to increase the ratio of the pressures, a bushing, the width of which would depend on the desired pressure, may be inserted into bore 23 and a smaller diameter sliding valve 11 may be used, thereby increasing the ratio of the area $A_1$ with respect to $A_2$ and increasing the ratio of the pressures $P_2$ with respect to $P_1$.

FIG. 3, which is a sectional view taken along the line 3—3 of FIG. 2, shows a supporting web 25 which assists in supporting sliding valve 11. Also shown in FIG. 3 is the bore 26 which communicates with the pressure outlet 8. The right hand side of the lower body portion 6 is open to chamber 19 through the openings 26 and 27, whereas the left hand side is provided with a wall 28 that separates the chamber 19 from the outlet 8, communication with the outlet 8 being provided through bore 26.

Assuming the ratio of the area $A_2$ to area $A_1$ as being .85, the operation of the device is as follows: the pressure entering at pressure inlet 7 passes on either side of web 25, up through openings 27 and enters the lower chamber 19. Area $A_1$, which has been defined above, is exposed to this pressure, the fluid is allowed to exit from this chamber 19 through bore 26 and out through the pressure outlet 8. It is to be understood, that in order for this regulator to function properly, it must first be connected up to a system, as the one shown in FIG. 1. The pressure outlet 3 is connected to the area which is to be maintained at 85% of the pressure exhausting from the outlet 8. As long as the pressure in outlet 3 is 85% of the pressure in the outlet 8, the diaphragm 21 will remain in its horizontal or unflexed position, since the ratio of the force created by $P_1 A_1$ is equal to the force created by $P_2 A_2$ and there is a state of equilibrium between the respective areas and their pressures. But, if the pressure in the outlet 3 should diminish or decrease, then the force created by the pressure within the lower chamber 19 which acts on the area $A_2$ will overcome the force created by the pressure within the upper chamber 17 acting on the area $A_1$ and will then force the diaphragm 21 upwardly and since the sliding valve 11 is fixedly secured to the diaphragm 21, valve 11 will also move upwardly. As the sliding valve 11 moves upwardly, the sliding valve aperture 14 moves into alignment with the orifice 13 permitting fluid to flow from the inlet 7 through the orifice 13, through the sliding valve aperture 14 and then out through the outlet 3. The flow of fluid through outlet 3 will continue until the pressure in upper chamber 17 builds up to a point sufficiently high to overcome the force created by the pressure acting on the area $A_2$, then the diaphragm 21 is returned to its horizontal or equilibrium position and when this is accomplished, the sliding valve 11 is returned to its original position and the sliding valve aperture 14 is lowered sufficiently to cut off the flow through the orifice 13.

Obviously many modifications and variations of the present invention are possible in the light of the above teachings. It is therefore to be understood that within the scope of the appended claims, the invention may be practiced otherwise than as specifically described.

What is claimed is:

1. In a jet engine having a compressor and a lubrication system, said lubrication system including an oil sump which is enclosed in a pressurized tank and an oil reservoir, a pressure pump for supplying oil under pressure to said engine, a scavenge pump for transferring oil from the oil sump to said reservoir, air bleed means connected to said compressor of said engine, a pressure regulator having an inlet connected to said bleed means and an outlet for supplying air to said oil sump to pressurize it, said pressure regulator having a second outlet for pressurizing said tank, said pressure regulator having means for maintaining the pressure in said oil sump at a predetermined percentage of the air pressure in said tank.

2. In an engine lubrication system having a pressurized tank, a pressure pump for supplying oil under pressure, a sump located in said tank into which oil from the engine is drained, an oil reservoir for receiving the oil after it is discharged from a scavenge pump, a combination comprising a supply of bleed air under pressure, a connection from said air supply to said sump and said pressurized tank, a valve in said connection, said valve having means for maintaining a predetermined ratio of the pressures within said sump and said pressurized tank whereby the pressure within said sump is maintained at a lower pressure than said tank and allows the leakage to flow into the sump rather than out.

3. An engine lubrication system as described in claim 2 wherein the means for maintaining a predetermined ratio of the pressures within said sump and said pressurized tank consists of a flexible member and a sliding valve member, said flexible member being responsive to the outlet pressures and said sliding valve member being operatively connected to said flexible member and maintaining the pressure leading to said sump at a predetermined percentage of the pressure in said pressurized tank.

References Cited in the file of this patent

UNITED STATES PATENTS

| | | |
|---|---|---|
| 2,509,085 | Dyke | May 23, 1950 |
| 2,578,275 | Whiteman | Dec. 11, 1951 |
| 2,592,140 | Holben et al. | Apr. 8, 1952 |
| 2,756,771 | Spencer | July 31, 1956 |